April 18, 1933.     M. SCHWANDER     1,903,883
ELECTRIC COOKING
Filed Feb. 4, 1931

Inventor:
Max Schwander,
by
Atty

Patented Apr. 18, 1933

1,903,883

UNITED STATES PATENT OFFICE

MAX SCHWANDER, OF LUCERNE, SWITZERLAND, ASSIGNOR TO FABRIK ELEKTROTHERMISCHER APPARATE A. G. LUZERN, OF LUCERNE, SWITZERLAND

ELECTRIC COOKING

Application filed February 4, 1931, Serial No. 513,425, and in Switzerland February 8, 1930.

Cooking or boiling upon electric hot plates has the disadvantage that the time occupied is too long and efficiency therefore suffers. Further the bottoms of the cooking vessels distort after a short time and must be replaced since with a curved bottom the transfer of heat is still worse.

Cooking vessels are already available with incorporated heaters. The manipulation thereof is, however, inconvenient since they must be connected to the mains by a flexible cable.

The object of the present invention is an electric cooking apparatus which does not possess the above mentioned disadvantages of the hitherto known apparatus.

This electric cooking apparatus consists of a cooking vessel with electric heating means and of an electric current supply device, the heating means of the cooking vessel and the electric current supply device being provided with current contacts so related with one another that by applying the cooking vessel onto the electric current supply device direct electric connection therebetween can be obtained by means of said contacts without any further connecting operation.

The contacts on the electric current supply device and on the cooking vessel with the heating means can be of any desired form, for example plug and socket contacts or preferably knife contacts which can be engaged and disengaged by a horizontal rotary movement of the vessel with respect to the current supply device in the manner of a bayonet like connection.

The current supply device can be constructed as a base support for the cooking vessel, and several such base supports can be built together.

An example embodying the invention is illustrated in the accompanying drawing.

Figure 1:
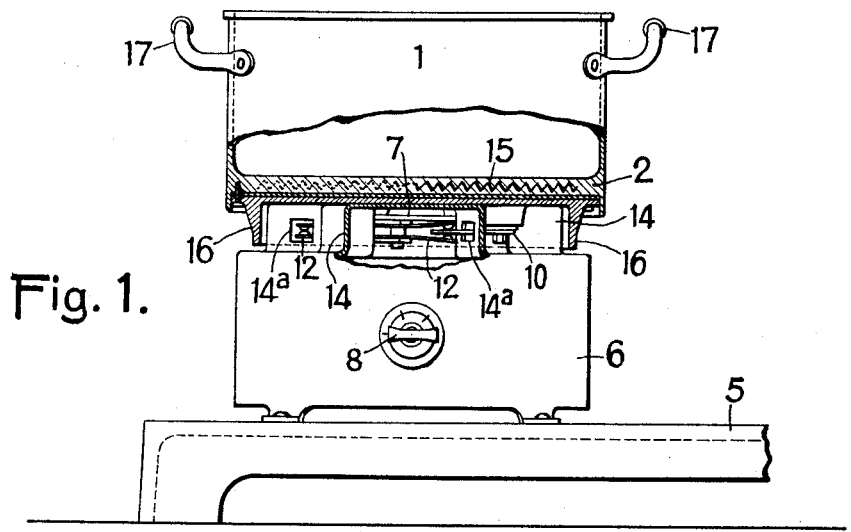
Figure 1 shows the cooking apparatus with but a single vessel, in elevation, the vessel being in partial section.
Figure 2:
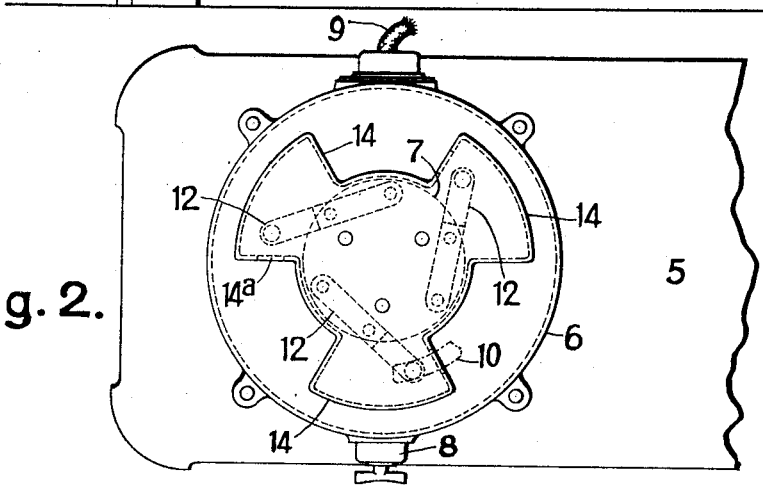
Figure 2 is a plan view of the current supply device with the vessel removed.
Figures 3, 4:
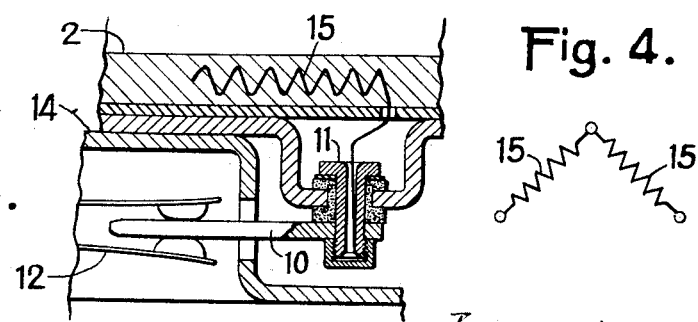
Figure 3 shows on an enlarged scale a section through one knife contact and a heating means connector on the vessel.

Figure 4 indicates diagrammatically the electric arrangement of the heating means of the vessel.

In the drawing, 1 is the cooking vessel with a bottom 2 having embedded therein a convenient electric heating resistance 15 indicated diagrammatically, as its construction and arrangement may be of any desired kind. From the resistance 15, in the example illustrated, lead three knife contacts 10 extending in a horizontal plane in a peripheral direction and connected through a bushing 11 insulated from the bottom 2 with the heating resistance 15 (Figure 3). The latter being for example arranged in two spiral elements, two of these contacts are connected to the separate ends of the two spiral elements 15, whilst the third contact leads to the other two common ends of the two elements (Figure 4).

5 is a plate, for instance of cast iron, upon which is mounted one or more base plates 6 with an internal current supply device 7 which can be controlled by the switch 8, and which is provided with a current connector 9. The current supply device 7 which is supplied through the connector 9, comprises three knife contacts 12 which are located within housings 14 and are each constituted of a pair of spring blades (Figure 3) so arranged as to be able to receive between them the corresponding male knife contacts 10. The knife contacts 12, which when the current is turned on, are under tension are completely enclosed by the housings 14 so that short-circuits cannot be caused by inadvertence.

The housings 14 have a lateral opening 14$^a$ for the entrance of the male knife contacts 10. Obviously the contacts 10 and the contacts 12 are equally distributed round about.

When the cooking vessel 1 is to be used, it is placed with its bottom 2 upon the housings 14 serving as base-support for the vessel and then turned a small distance in peripheric direction, so that the male contacts 10 engage the female contacts 12 in the manner of bayonet junction. Thus, electric connection is established between the current supply device and the vessel heating means. The switch 8 is then actuated to switch in one or both heating elements of the resistance 15 according to whether it is desired to cook slowly or quickly.

If it is desired to remove the cooking vessel it is turned a small distance in the reverse direction, whereby the electrical connection between the stationary current supply device and the vessel heating means is broken.

No cables etc. lead to the cooking vessel, which considerably facilitates the handling and cleansing thereof.

A plurality of current regulating switches can be provided in the base plate 6 so that several cooking vessels can be used simultaneously.

In place of knife contacts between the cooking vessel and the current supply device, other contact systems can be used. The horizontal knife contacts are very practical however since there is no vertical pressure on the base plate during connecting and disconnecting.

The bottom of the cooking vessel is provided with an annular projecting protection rim 16 of such a length that the knife contact blades 10 are prevented from being damaged when the vessel is manipulated or placed for example on a table and the like, seating taking place on said rim 16.

The handles 17 of the cooking vessel are so arranged that in taking the same by the two handles, the vessel is in good position for its seating on the current supply device.

What I claim is:—

Electric cooking apparatus consisting of a cooking vessel with electric heating means and of an electric current supply device, the heating means of the cooking vessel comprising a heating resistance in connection with angularly displaced horizontal knife contact blades, the electric current supply device comprising equally angularly displaced pairs of horizontal knife contact blades, protecting housings being provided for enclosing said pairs of knife contact blades and having slots for the entrance of the cooking vessel knife contact blades, the cooking vessel knife contact blades being so arranged with respect to the current supply pairs of knife contact blades as to establish electric connection between the respective contact blades by a rotary motion of the cooking vessel in the manner of a bayonet junction, the vessel being provided at its bottom with a projecting rim for protecting its contact blades and for ensuring operative cooperation thereof with the respective current supply knife contact blades.

In witness whereof I have hereunto signed my name this 24th day of January 1931.

MAX SCHWANDER.